May 28, 1957 W. J. FRIDERICI 2,793,611
ARTICLE SUPPORTING MEANS
Filed June 15, 1953

INVENTOR.
Wayne J. Friderici
BY
Hyde, Meyer, Baldwin & Doran
ATTORNEYS

United States Patent Office 2,793,611
Patented May 28, 1957

2,793,611
ARTICLE SUPPORTING MEANS

Wayne J. Friderici, Port Clinton, Ohio, assignor to The Standard Products Company, Cleveland, Ohio, a corporation of Ohio Application June 15, 1953, Serial No. 361,744

13 Claims. (Cl. 118—500)

This invention relates to improvements in an article supporting means and more particularly to an article or work piece supporting means for a flocking machine.

One of the objects of the present invention is to provide an apparatus for supporting one or more articles for flocking with the means for supporting the article extending less than the lateral width of the article so that proper flocking can take place.

A further object of the present invention is to provide an article support for a flocking machine characterized by the economy of its manufacture, its structural simplicity, and its ease of use.

Other features of this invention reside in the arrangement and design of the parts for carrying out their appropriate function.

Other objects and advantages of this invention will be apparent from the accompanying drawings and descriptions and the essential features will be set forth in the appended claims.

In the drawings,

Fig. 4 is a transverse vertical sectional view, similar to Fig. 3, of a modified form of supporting apparatus; while

Figure 1:
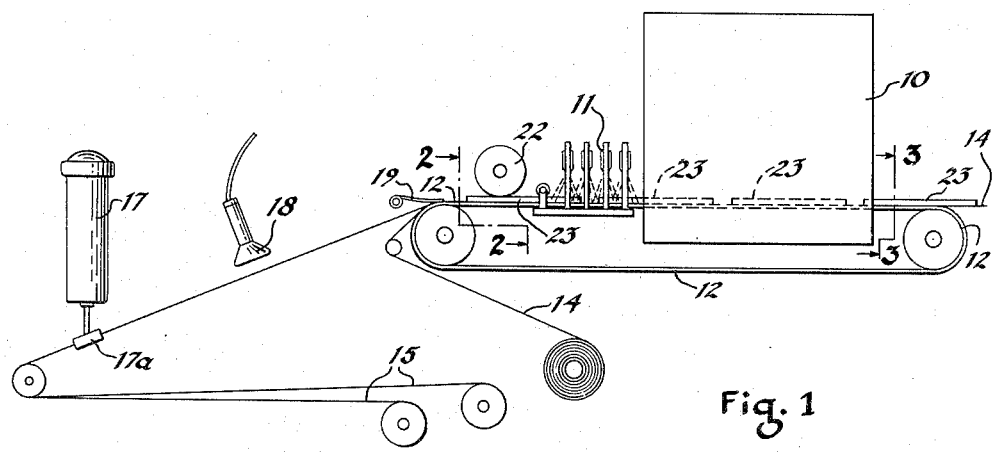
Fig. 1 is the side elevational view of a flocking machine and an apparatus for supporting one or more articles during flocking.

Before the article or work piece support here illustrated is specifically described, it is to be understood that the invention here involved is not limited to the structural details or arrangement of parts here shown since supports embodying the present invention may take various forms. It also is to be understood that the phraseology or terminology here employed is for purposes of description and not of limitation since the scope of the present invention is denoted by the appended claims. While this invention in a support might be adapted to various types of processes and machines, it has been chosen to show the same as applied to a flocking machine disclosed in more detail in the copending U. S. patent application filed by W. J. Friderici on June 15, 1953 entitled "Apparatus for Preventing Flock Build-up on a Flocking Machine Electrode," Serial No. 361,791 and copending U. S. patent application filed by W. J. Friderici on June 15, 1953 entitled "Timing Means," Serial No. 361,726. Although these applications disclose that the flock material moves downwardly toward the article during the flocking operation, it will be readily apparent as the present description proceeds, that the present invention in a support can be used in any type of flocking machine wherein the flock travels against the article from any angle. Sometimes the article being flocked is oriented to move vertically while the flock material is travelling in a generally horizontal direction against it while other times the article is oriented by suspension from a support while the flock travels upwardly against it. For simplicity in illustration, only one orientation of the article being flocked is shown in the drawings but it should be readily understood that any of these other mentioned orientations can exist.

It is sometimes difficult to flock an irregularly shaped article that has one side which will be used in attachment during assembly where no flock is desired since the flock should be up to and slightly over the edges of this attaching side so that the article will appear neat when assembled with other members in the finished product. The electrostatic field must be such that the flock will reach all the crevices in the article.

The flocking apparatus is generally shown in Fig. 1. It includes a flocking machine 10 for applying the flock to the article and this machine may take the form of the flocking apparatus disclosed in the aforementioned copending U. S. patent application Serial No. 361,791 or any other type flocking apparatus. An endless conveyor belt member or driving member 12 is driven by driving wheels at the opposite ends thereof for carrying the article through the flocking machine for processing. A group of glue nozzles 11 are directed at the article before it enters the flocking machine 10 for spraying an adhesive on the article so that the flock will adhere thereto.

A support is provided for carrying one or more articles through the flocking machine 10 by being driven by the endless conveyor belt member 12. It includes a conveyor base strip 14 engageable in Fig. 1 with the upper surface of the top flight of the conveyor 12 for movement through the flocking machine. This strip 14 consists of disposable paper or other flexible material supplied in any convenient form, such as roll form, so that it provides a continuous ribbon being fed through the machine. Two spaced, approximately parallel cords 15, 15 extend from supply rolls toward the upper side of the base strip 14 in Fig. 1 and are attached thereto, as seen in Fig. 2, to form the completed support.

Means is provided for dispensing or applying adhesive to the cords 15, 15 before assembly with the base strip 14. A gravity feed glue dispenser 17 gradually feeds glue or adhesive down onto the cords 15 as they are pulled through the cord guide 17a so that each cord has an approximately uniform coating 21 thereon. This adhesive is of the pressure sensitive type, requiring no added moisture, to hold the article being flocked on the conveyor base strip 14 in proper alignment regardless of the orientation of the article thereon. An infra-red heat lamp 18 can be provided, if necessary, to cause the adhesive to dry sufficiently so that it will have the proper tackiness to hold the article properly aligned at the necessary time against air drafts and other forces acting thereon.

A spring presser 19 has a spring biased arm pressing downwardly the adhesive-coated cords 15, 15 against the top side of the base strip 14 and against the endless conveyor belt 12 which serves as a backing therefor. This action causes the adhesive coatings 21, 21 of cords 15, 15 to adhere to the top surface of the base strip 14 and also causes synchronous feeding of the base strip 14 and the cords 15, 15 from their respective supply rolls by the endless conveyor belt member 12. The cord-engaging lower base of the presser member 19 can have two parallel grooves therein, if necessary, to insure that the cords 15, 15 will always have the proper spacing after being assembled in the manner shown in Fig. 2.

Figure 2:
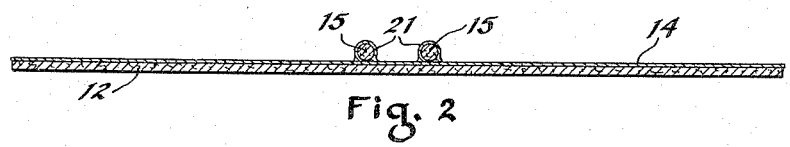
Fig. 2 is a transverse vertical sectional view through a conveyor belt member and the apparatus driven thereby for supporting one or more articles during flocking.
Figure 3:
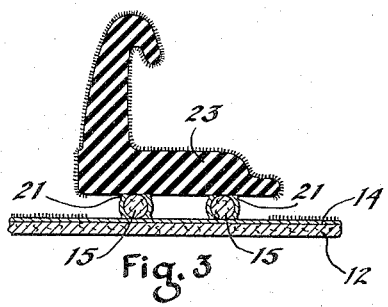
Fig. 3 is a transverse vertical section view, similar to Fig. 2, taken through the conveyor belt member, support and flocked article after flocking.

The complete support is shown in Fig. 2 as including a conveyor base strip 14 with supporting means for the article to be flocked projecting from the top surface of said strip on the side opposite the conveyor belt member 12. These spaced cords 15, 15 are approximately parallel and extend in the direction of the conveyor base strip travel. They are adhesively secured to the base strip 14 by the adhesive coating 21 to form a continuous supporting means strip portion extending along the full length of the base strip 14. These cords 15, 15 are in registration with the supporting, or lower surface of the article to be flocked, as seen in Fig. 3, with the adhesive coating 21 on the cords designed for removably securing one or more articles to the conveyor base strip 14 as it moves through the flocking machine while always assuring that the article will be properly oriented for flocking.

Means is provided for pressing the articles one at a time against the adhesive layers 21, 21 on the cords. This is shown by the free-to-rotate roll 22 having a peripheral groove cut to mate with the top surface of each article and to properly align each article with the spaced cords 15, 15 for proper support. The properly positioned article is shown at 23 in Fig. 3.

This article 23 of irregular contour has passed through the glue nozzles 11 and the flocking machine 10. The flock adheres to the article in all crevices therein and extends slightly under the bottom or supporting surface thereof since the lateral width subtended by the spaced cords 15, 15 forming said article supporting means is less than the supporting surface or lower surface of the article 23 engaging the adhesive coating 21. After flocking, the article 23 is relatively easily removed from the cords 15, 15 since there are only two relatively narrow adhesive securement strips therebetween. The bottom or supporting surface of the article 23 is relatively free of flock so that it can be secured to other parts in the assembly of the final article, but the article is flocked right up to and slightly over the bottom edge so that the flocked article 23 presents a nice appearance in the finished assembly. The adhesive sprayed onto article 23 before flocking by nozzles 11 will cause flock to adhere in this manner, coextensive with the adhesive, since the bottom supporting surface of the article is spaced from strip 14 at its lateral edges. If the flocked article 23 is a flock-coated piece of rubber, it may be necessary to cure the rubber material after the flocking by machine 10. In that case, the disposable paper strip 14 and approximately parallel cords 15, 15 are easily cut between the spaced articles on the support so that the flocked article is more easily handled during the curing process without requiring that article 23 be actually handled.

Figure 4:
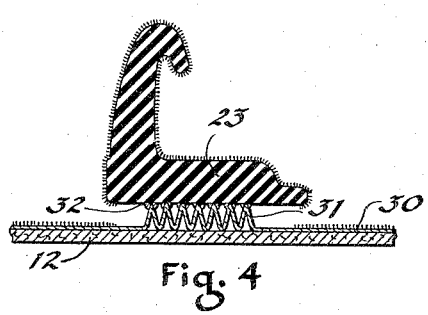

Fig. 4 discloses another form of the invention in a support for articles during flocking. In this modification, a conveyor base strip 30, similar to base strip 14 and formed of disposable paper, is provided and has a supporting means for each article projecting from the top surface of the strip opposite the conveyor member 12 for registration with the supporting surface or lower surface of the article 23. The supporting means in this modification takes the form of approximately V-shape folds in the base strip 30 extending along the length of the base strip in the direction of travel. Means can be provided for dispensing an adhesive layer 32 on the tops of the V-shape folds 41 for engagement with the supporting surface of the article by a means that is somewhat comparable to the adhesive dispenser 17 in Fig. 1 but which forms only an adhesive layer on the top of the folds. Means can also be provided for pressing the article 23 against the adhesive layer 32 on the supporting folds and may take the form of roll 22 or some other similar device. It should be noted that the lateral width subtended by the folds 31 forming the article supporting means is less than the supporting or bottom surface of the article which it engages so that the lower article supporting surface facing the conveyor base strip 30 is spaced from the strip at its lateral edges. Then, the adhesive sprayed onto this article before flocking by nozzles 11 in Fig. 1 will cause flock to adhere to the lateral edges of the article supporting lower surface but will not extend substantially under the article to cover the supporting surface thereunder. The article 23 may be easily removed from the support since the folds 31 make only a narrow band of contact with the bottom or supporting surface of the article 23. The disposable conveyor base strip and V-shape folds 30 and 31 are easily cut for convenient handling after flocking if actual handling of the article 23 is not desirable until subsequent operations have been completed.

Figure 5:
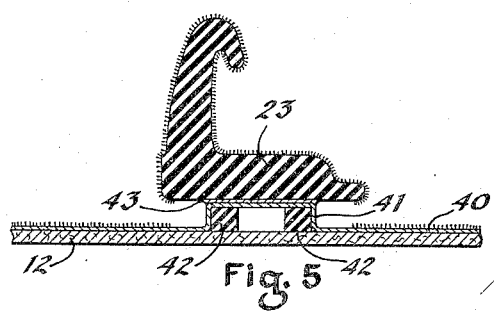
Fig. 5 is a transverse vertical sectional view, similar to Fig. 4, of another modified form of supporting apparatus.

Fig. 5 discloses another form of the invention in a support for articles during flocking. In this modification, a conveyor base strip 40, similar to base strip 14 and formed of disposable paper, is provided and has a supporting means for each article projecting from the top surface of the strip opposite the conveyor member 12 for registration with the supporting surface or lower surface of the article 23. The supporting means in this modification takes the form of fold lines in the base strip 40 projecting upwardly to form a rib extending along the length of the base strip in the direction of travel.

The rib takes the form of an inverted U-shape in Fig. 5 having an adhesive layer 43 on its top surface. But it should be readily understood that the shape of the rib will depend upon the orientation of the article 23. For example, if the article 23 is suspended from the conveyor base strip 40 with the flock being directed upwardly against the article 23, as occurs in some flocking methods, the rib 41 will be U-shape. Therefore, the term U-shape, as used in the claims, is intended to cover a rib of the general configuration of rib 41 regardless of the orientation of the article 23 and its supporting rib. The rib is formed by having one or more spacers 42 extending in the direction of travel of conveyor belt member 12 and lying between the conveyor belt member 12 and the conveyor base strip member 40 so that a portion of the base strip member 40 is forced upwardly away from the conveyor member surface to form a rib-type supporting means. The spacer 42 can be secured to the conveyor belt member 12, secured to the conveyor base strip member 40, or alternatively fixed to the flocking machine base with the conveyor belt 12 sliding under it and the strip 40 sliding over it. As an alternate construction, it may consist of spaced bands, such as rubber bands, encircling the endless conveyor belt 12 while not being secured to either of said members but merely lying between them to provide the proper upheaval in the conveyor base strip 40. When rubber bands are used, the opposite vertically extending sides of rib 41 may diverge in the downward direction since they are not secured to the rubber bands. Of course, if rib 41 has sufficient stiffness, spacer 42 need not be used.

Means can be provided for dispensing an adhesive layer 43 on the top of the rib 41 for engagement with the supporting surface of the article by a means that is somewhat comparable to the adhesive dispenser 17 in Fig. 1 but which forms only an adhesive layer on the top of the rib. In this case, adhesive is applied in a narrow zigzag path to limit the area adhered. Means can also be provided for pressing the article 23 against the adhesive layer 43 on the supporting rib and may take the form of roll 22 or some other similar device. It should be noted that the lateral width subtended by the rib 41 forming the article supporting means is less than the supporting or bottom surface of the article which it engages so that the lower article supporting surface facing the conveyor base strip 40 is spaced from the strip at its lateral edges. Then, the adhesive sprayed onto this article before flocking by nozzles 11 in Fig. 1 will cause flock to adhere to the lateral edges of the article supporting lower surface but will not extend substantially under the article to cover the supporting surface thereunder.

The disposable conveyor base strip and rib 40 and 41 are easily cut for convenient handling after flocking if handling of the article 23 is not desirable until subsequent operations have been completed.

In all forms of the invention, the strip 14, 30 or 40 is generally made of paper and serves as a disposable glue spray mask to protect the conveyor belt 12 with means being provided for supporting the article 23 in spaced relation to conveyor 12 and to the main body of the covering strip formed by the opposite side edges of the strip lying on conveyor 12 and shown as flock covered in Figs. 3, 4 and 5. In all forms of the invention, this supporting means comprises parts (cords 15, folds 31 or rib 41) projecting from this main body of the covering strip and on which articles 23 are supported.

It should be readily apparent that any or all of the supports in Figs. 3, 4 and 5 might adequately support articles thereon for flocking without the use of an adhesive connection between the supporting means projecting upwardly from base strips 14, 30 or 40 and the supporting means projecting upwardly from base strips 14, 30 or 40 and the supporting surface of the article 23. However, the use of the article support without adhesive would be limited to certain conditions and it not as desirable as the present construction. Adhesive prevents the blast from the blue spray guns blowing the articles 23 out of position, holds articles 23 straight when they have tendency to buckle or will not naturally remain straight, and makes the orientation of the article 23 as it moves through the flocking machine immaterial. In the construction illustrated in the drawings, article 23 can be suspended while the flock moves upwardly against it. This would not be possible if an adhesive were not used.

Various changes in details and arrangement of parts can be made by one skilled in the art without departing from the spirit of this invention or the scope of the appended claims.

What I claim is:

1. A support for one or more articles during flocking, comprising a conveyor base strip for one or more articles, and a supporting means for each article projecting from the surface of said strip for registration with the supporting surface of said article, said supporting means being a continuous strip portion formed by V-shape folds in said base strip extending along the length of said base strip.

2. A support for one or more articles during flocking, comprising a conveyor base strip for one or more articles, a supporting means for each article projecting from the surface of said strip for registration with the supporting surface of said article, said supporting means being a continuous strip portion formed by V-shape folds in said base strip extending along the length of said base strip, and an adhesive layer on said folds for engagement with the supporting surface of said article for removably securing said article to said apparatus for flocking.

3. A support for one or more articles during flocking, comprising a conveyor base strip for one or more articles, and a supporting means for each article projecting from the surface of said strip for registration with the supporting surface of said article, said supporting means being a continuous strip portion formed by a U-shape rib in said base strip extending along the length of said base strip.

4. A support for one or more articles during flocking, comprising a conveyor belt member, a base strip member removably engaging and driven by said conveyor belt member, and a supporting means for each article projecting from the surface of said strip opposite said conveyor belt member for registration with the supporting surface of said article, said supporting means including a spacer extending in the direction of conveyor belt member travel and lying between said members so that a portion of said base strip member forms a continuous strip portion extending along the length of said base strip member for supporting one or more articles.

5. A support for one or more articles during flocking, comprising a conveyor belt member, a base strip member removably engaging and driven by said conveyor belt member, a supporting means for each article projecting from the surface of said strip opposite said conveyor belt member for registration with the supporting surface of said article, said supporting means including a spacer secured to one of said members and extending in the direction of conveyor belt member travel and lying between said members so that a portion of said base strip member forms a continuous strip portion extending along the length of said base strip, and an adhesive layer on said strip portion for engagement with the supporting surface of said article for removably securing said article for flocking.

6. An apparatus for supporting one or more articles for flocking, comprising a conveyor base strip for one or more articles, a supporting means for each article projecting from the surface of said strip for registration with the supporting surface of said article, said supporting means including spaced cords extending in the direction of conveyor base strip travel for adhesive securement to said base strip to form a continuous strip portion extending along the length of said base strip, and means for dispensing an adhesive layer on said cords before assembly with said base strip for causing securement therebetween and for removably securing said article to said base strip for flocking by having the adhesive engage the supporting surface of said article.

7. An apparatus for supporting one or more articles for flocking, comprising a base strip supplied in the form of a continuous ribbon, two spaced cords extending toward one side of said base strip, and means for applying adhesive to said cords, means for pressing the cords against said one side of said base strip after the adhesive has been applied, said adhesive coated cords forming a continuous supporting means for each article extending along the length of the base strip for registration with the supporting surface of each article with the adhesive thereon for removably securing one or more articles to said supporting means.

8. An apparatus for supporting one or more articles for flocking, comprising a base strip supplied in the form of a continuous ribbon, a driving member engaging one side of said base strip and feeding it from the supply, two spaced cords extending toward the other side of said base strip, and means for applying adhesive to said cords, means for pressing the cords against the other side of said base strip backed by said driving member after the adhesive has been applied so that the adhesive causes synchronous feeding and assembly of the cords and base strip by adhesion therebetween, said adhesive coated cords forming a continuous supporting means for each article extending along the length of the base strip for registration with the supporting surface of each article with the adhesive thereon for removably securing one or more articles to said supporting means.

9. An apparatus for supporting one or more articles for flocking, comprising a base strip supplied in the form of a continuous ribbon, an endless conveyor belt engaging one side of said base strip and feeding it from the supply, two spaced cords extending toward the other side of said base strip, means for applying adhesive to said cords, means for pressing the cords against the other side of said base strip backed by said endless conveyor belt after the adhesive has been applied so that the adhesive causes synchronous feeding and assembly of the cords and base strip by adhesion therebetween, said adhesive coated cords forming a continuous supporting means for each article extending along the length of the base strip for registration with the supporting surface of each article, and means for pressing said article against the adhesive coating of the cords by pressing said one article on the side thereof away from said article supporting surface for removably securing said article to said apparatus for flocking, the lateral width subtended by the spaced cords being less than the supporting surface of said article engaging said adhesive so that the article supporting surface facing said strip is spaced from said strip at its lateral edges, whereby adhesive sprayed onto said article before flocking will cause flock to adhere to the lateral edges of said article supporting surface but will not extend substantially over said article supporting surface.

10. A support for one or more articles during flocking thereof, comprising a conveyor, a disposable covering strip therefor, and means for supporting the article or articles to be flocked in spaced relation to said conveyor and to the main body of said covering strip, said supporting means comprising parts projecting from the main body of said covering strip and on which rest the supporting surface or surfaces of the article or articles to be flocked during flocking thereof, all of said projecting parts being of less width than that of the supporting surface or surfaces of the article or articles to be flocked, to thereby expose for flocking purposes the marginal portions of the supporting surface or surfaces of said article or articles spaced away from the main body of said covering strip.

11. A support for one or more articles during flocking thereof, comprising an elongated conveyor, an elongated disposable covering strip therefor, and means for supporting the article or articles to be flocked in spaced relation to said conveyor and to the main body of said covering strip, said supporting means comprising integral projecting parts of said covering strip extending lengthwise longitudinally thereof in the direction of conveyor travel and on which the article or articles to be flocked are supported during flocking thereof.

12. A support for one or more articles during flocking thereof, comprising an elongated conveyor, an elongated disposable covering strip therefor, and means for supporting the article or articles to be flocked in spaced relation to said conveyor and to the main body of said covering strip, said supporting means comprising parts projecting from the main body of said covering strip extending lengthwise longitudinally thereof in the direction of conveyor travel and on which the article or articles to be flocked are supported during flocking thereof, and a layer of adhesive on said projecting parts positioned to be located between said parts and article or articles to cause said article or articles to be removably secured to said projecting parts.

13. A support for one or mort articles during flocking thereof, comprising an elongated conveyor, an elongated covering strip therefor, and means for supporting the article or articles to be flocked in spaced relation to said conveyor and to the main body of said covering strip, said supporting means comprising parts projecting from the main body of said covering strip extending longitudinally thereof and on which rest the bottom surface or surfaces of the article or articles to be flocked during flocking thereof, said projecting parts being in spaced relation to the side edges of the covering strip and all of said projecting parts being of less overall width than that of the bottom surface or surfaces of the article or articles to be flocked, to thereby expose for flocking the marginal portions of the bottom surface or surfaces of said article or articles.

References Cited in the file of this patent

UNITED STATES PATENTS

| | | |
|---|---|---|
| 1,529,134 | Kelter | Mar. 10, 1925 |
| 1,979,758 | Merritt | Nov. 6, 1934 |
| 2,221,367 | Bishop et al. | Nov. 12, 1940 |
| 2,332,946 | St. Hilaine | Oct. 26, 1943 |